United States Patent
Rayner

[11] 3,978,324
[45] Aug. 31, 1976

[54] AUTOMATIC CROP INVENTORY SYSTEM

[75] Inventor: John Allan Rayner, Hitchin, England

[73] Assignee: Hawker Siddeley Dynamics Limited, England

[22] Filed: Feb. 4, 1975

[21] Appl. No.: 547,060

[52] U.S. Cl. .................... 235/151.3; 178/DIG. 20; 178/DIG. 36; 235/92 PC
[51] Int. Cl.² .................... H04N 7/02; G06G 7/48
[58] Field of Search ........ 235/151.3, 151.35, 92 PC; 178/DIG. 38, 37, 36, 1, 20, 22, 6.8; 343/5 PD, 5 SC, 6 TV; 324/71 PC

[56] References Cited
UNITED STATES PATENTS

| | | | |
|---|---|---|---|
| 3,390,229 | 6/1968 | Williams | 178/DIG. 1 |
| 3,805,028 | 4/1974 | Morton | 235/92 PC |
| 3,811,036 | 5/1974 | Perry | 235/92 PC |
| 3,867,613 | 2/1975 | Schoon | 235/92 PC |

*Primary Examiner*—Joseph F. Ruggiero
*Attorney, Agent, or Firm*—Rose & Edell

[57] ABSTRACT

In an automatic inventory system for crops, especially tree-borne crops, an airborne television camera views the area being surveyed and delivers an analogue video signal which is converted into a series binary digital signal by a level detector. The serial digital signal is received in a shift register that delivers a parallel digital output to a computer. The shift register is controlled by shift pulses derived from a pulse generator that has the video signal applied to it to maintain the pulses in synchronism with the camera operation. The computer receives the information from the shift register a frame at a time and determines from it parameters such as the average size, and spacing of crop-bearing trees and their numbers.

6 Claims, 3 Drawing Figures

AUTOMATIC CROP INVENTORY SYSTEM

This invention relates to a system for performing an automatic inventory of crops.

Most remote sensing pattern recognition techniques in agricultural applications have used multispectral methods. However, these methods can be only of limited use due to wide variations in soil and plant conditions. Bioclimatic variations can also result in crops undergoing stress of one form or another, which results in a wide variation of possible multispectral signatures.

An object of this invention is to provide an inventory system based on characteristics of the crop which do not vary widely from region to region, and which can provide the basis for the separation of one crop from another. This characteristic is the regular arrangement of the crop in terms of spacing or size.

According to the present invention, there is provided an apparatus for the automatic inventory of crops, comprising a television camera for viewing the area under surveillance and deriving, by scanning, a video signal whose amplitude constitutes an analogue of the reflectance of the succession of points being scanned, a level detector which produces an output signal when said analogue video signal exceeds a predetermined threshold level, a shift register receiving the output signals of the level detector as a series binary digital information train and making the information available as a parallel binary output, a sample pulse generator which is synchronised to the video signal and the output of which clocks the information from the level detector into the shift register, and a computer which accepts a complete frame of video information from the shift register parallel output into a bulk store and then performs analysis of the information to determine parameters of the crop being surveyed.

In general, the television camera will be mounted in some form of surveying transportation, usually an aircraft, so therefore an intermediate recording medium will be required to enable the video information to be input to the remainder of the equipment. However, this in no way alters the operation of the equipment, and the inventive aspects of the apparatus remain unchanged.

By way of example, what follows is a description of the system when applied to trees which have a maximum diameter, and a known range of spacing. It must be understood however, that this is not the exclusive use of the system, and that it can be applied to any regularly planted crops.

The embodiment to be described is illustrated in the accompanying drawings, in which.

Figure 1:
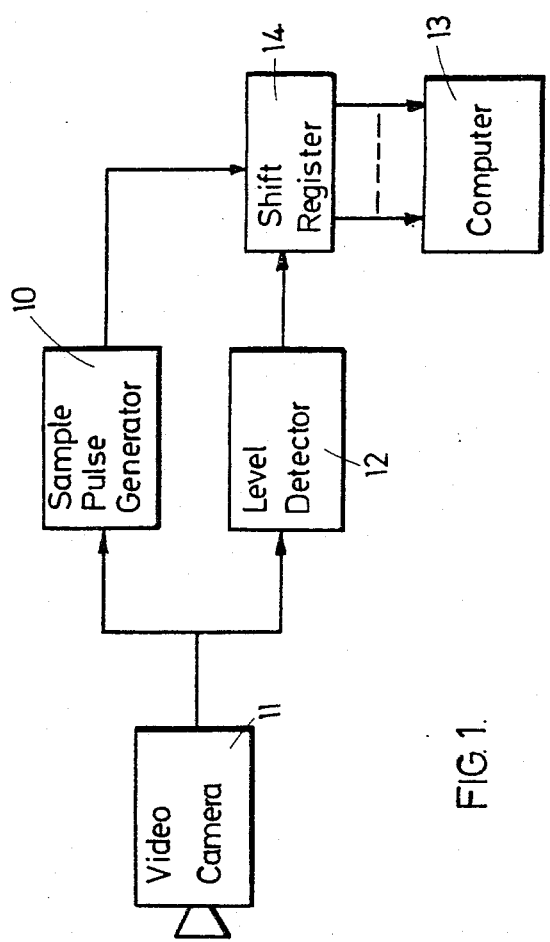
FIG. 1 is a schematic representation of an inventory system embodying the invention.

Referring to FIG. 1, a television camera 11 is mounted, usually in an aircraft, to give "snap-shot" pictures of the area being surveyed. The video information is then passed through a level detector 12 which produces a "one" output signal or a "zero" output signal according to whether the video analogue reflectance signal it receives is above or below a predetermined threshold level. This threshold level is adjustable. The output of the level detector 12 passes to a series-to-parallel shift register 14, which thus receives the information in the form of a series binary digital signal train. The clocking of the information in the shift register 14 is controlled by pulses from a sample pulse generator 10 which receives the video signal and is synchronised to it by means of a phase lock loop, thereby synchronising the generation of the sample pulses with the camera operation. A computer 13 is presented by the shift register 14 with a complete frame of video information at a time in parallel formation, a binary "one" representing a point of vegetation, and a binary "zero" representing a point of non-vegetation. In the particular embodiment of the invention here described, the number of sample points along a scan line is 1000, while the number of lines scanned in each frame is 1000. Thus each binary digit, with a field of view of 50 meters by 50 meters, corresponds to an area of 5cm by 5cm.

It is to be understood that the invention is not restricted to the details of the above described embodiment. For example, the number of TV lines and field of view depend upon the size of crop being surveyed, and the resolution required.

Figure 2:
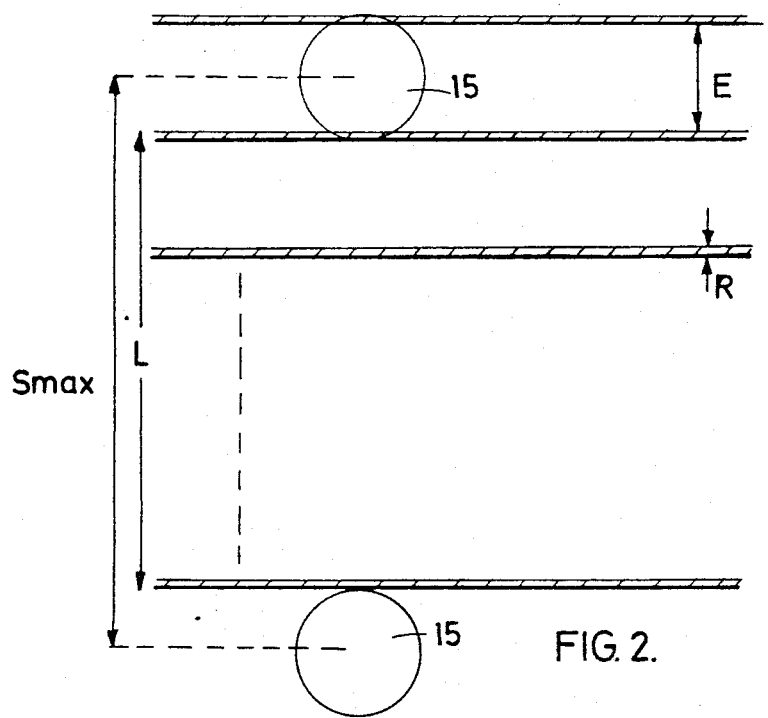
FIG. 2 is an illustration of the number of lines and the distance between lines used for spacing measurements.

In order to find out the spacing between an object detected in a scan line and neighbouring ones, a set of equally spaced scanlines is used. The number of scan lines and the spacing between each pair of adjacent lines depends on the line resolution, the minimum diameter to be detected and the maximum spacing between trees. With reference to FIG. 2, with a resolution R, a minimum tree diameter $d$, and a maximum tree spacing S max, the distance E between two spacing measurement lines must be such that $E + 2R \leq d$.

The number of lines is given by N where $$N \geq \text{int} [ (S \max - d) / (E + R) ] + 1$$

Figure 3:
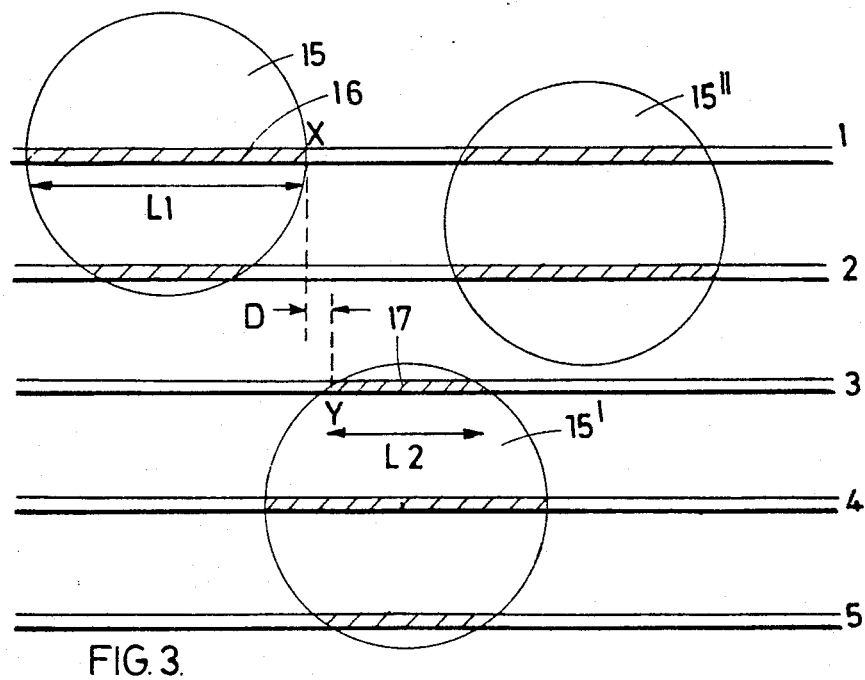
FIG. 3 is an illustration of the method of recognising and measuring the crop being surveyed.

The width of the bundle of lines L, used for spacing measurements can be calculated by $L + (N - 1)(E + R) + R$ With reference to FIG. 3, the first line 1 of the bundle is used for length measurement of a segment 16 of an object 15, in this case a tree. Then, starting at the trailing edge of the segment 16 detected in the first line, all lines are examined in order to detect which one shows a segment of a neighbouring object, i.e. the next tree, beginning first.

After the trailing edge X of the segment 16 detected in the first line, the leading edge Y of a segment 17 is detected in the third line denoting a neighbouring tree 15'. If the lengths of the segments 16 and 17 are $L_1$ and $L_2$, respectively, and the distance along the scan lines between the points X and Y is D, then the spacing is $(L1 + 2D + L2)/2$ If the spacing measurement so obtained is greater than S max, the segment 16 first detected in the counting or length measurement line 1 is disregarded as falling into an unrecognisable ambiguity region. If the counting line 1 itself is used as a spacing measurement line as described, that imposes an inherent limit on the minimum tree spacing that can be detected, which is utilised to discard segment length counts falling into this second ambiguity region.

When, by reason of the spacing distance measurement being within the accepted limits, a segment 15 is recognised as a segment of the crop being surveyed, a counter containing the digital number corresponding to its length is incremented by one to pass this number into the computer bulk store. At the end of the assessment of the vegetation in the video frame, the distribution and lengths of the segments recognised are used by the computer to calculate the average tree diameter, the number of trees within the frame and the average spacing of the culture.

What we claim is:

1. Apparatus for use in the automatic inventory of crops, comprising an airborne television camera for viewing the area under surveillance from the air and deriving, by scanning, a video signal whose amplitude constitutes an analogue of the reflectance of the succession of points being scanned, a level detector which produces an output signal when said analogue video signal exceeds a predetermined threshold level, a shift register receiving the output signals of the level detector as a series binary digital information train and making the information available as a parallel binary output, a sample pulse generator which is synchronized to the video signal and the output of which clocks the information from the level detector into the shift register, and a computer which accepts a complete frame of video information from the shift register parallel output.

2. Apparatus according to claim 1, wherein the level detector is adjustable to change the threshold level.

3. In performing an inventory of crops within a defined geographic area, the method of providing signals representative of crop density and suitable for computer analysis, said method comprising the steps of:

flying over said defined geographic area in an aircraft;

viewing said defined geographic area from said aircraft with a video camera to provide an analog video signal of amplitude which corresponds to the reflectance of images viewed by said camera;

converting said video signal to a series of binary pulses, each pulse having a binary level determined by the reflectance at a respective portion of the image viewed by said camera; and shifting said binary pulses into a register in a prescribed pulse sequence.

4. The method according to claim 3 wherein the method of converting includes the steps of:

comparing the amplitude of successive portions of said analog video signal to a threshold level; and providing a pulse at one logic level for only those portions of the video signal in which the signal amplitude exceeds the threshold level.

5. The method according to claim 4 wherein said threshold level is selectively adjustable.

6. The method according to claim 3 wherein said register is a shift register capable of serially receiving a sufficient number of binary pulses to represent an entire frame of video information from said camera, and wherein said shift register is capable of delivering said sufficient number of pulses in parallel to a utilization device.

* * * * *